(12) United States Patent
Chebykin (10) Patent No.: US 12,254,329 B2
(45) Date of Patent: Mar. 18, 2025

(54) BUFFERING AND REPLAYING USER INTERACTION EVENT CONTENT RECEIVED AT A FRONTEND APPLICATION WHILE ASYNCHRONOUSLY LOADING RESOURCES SUPPORTING A PAGE FROM A BACKEND APPLICATION OF A MULTIUSER COLLABORATION TOOL

(71) Applicants: Atlassian Pty Ltd., Sydney (AU); Atlassian Inc., San Francisco, CA (US)

(72) Inventor: Sergey Chebykin, San Mateo, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/853,681

(22) Filed: Jun. 29, 2022

(65) Prior Publication Data

US 2024/0004674 A1 Jan. 4, 2024

(51) Int. Cl.
*G06F 9/44* (2018.01)
*G06F 9/445* (2018.01)
*G06F 9/451* (2018.01)

(52) U.S. Cl.
CPC .......... *G06F 9/451* (2018.02); *G06F 9/44521* (2013.01)

(58) Field of Classification Search
CPC .............................. G06F 9/451; G06F 9/44521
See application file for complete search history.

(56) References Cited

U.S. PATENT DOCUMENTS

| | | | |
|---|---|---|---|
| 8,893,014 B1* | 11/2014 | Au | H04L 67/02 715/744 |
| 9,479,618 B2* | 10/2016 | Bischoff | H04L 67/131 |
| 10,013,500 B1* | 7/2018 | McClintock | G06F 11/3006 |
| 11,687,524 B2* | 6/2023 | Rohde | H04L 67/306 707/734 |
| 2013/0041946 A1* | 2/2013 | Joel | H04L 67/01 709/203 |
| 2021/0382734 A1* | 12/2021 | Rosenstein | G06Q 10/063114 |
| 2022/0129148 A1* | 4/2022 | Shang | G06F 3/1462 |
| 2022/0188128 A1* | 6/2022 | Abadzhimarinov | G06F 9/44521 |
| 2022/0222107 A1* | 7/2022 | Beri | G06F 9/451 |

* cited by examiner

*Primary Examiner* — Mahelet Shiberou
(74) *Attorney, Agent, or Firm* — Brownstein Hyatt Farber Schreck, LLP (57) ABSTRACT

Systems and methods for servicing page requests from a cloud-based software service. In particular, page tree elements defining a page requested from a backend of a cloud-based software service can be can be transmitted in a manner that prioritizes elements and functionality likely to be interacted with by a particular user first (e.g., within a threshold time of apparent pageload completion). Other elements unlikely to be interacted with by the user may be loaded asynchronously and/or on a deferred basis. Inputs provided to these elements can be buffered by an input buffer script to capture unexpected inputs thereto.

9 Claims, 4 Drawing Sheets

BUFFERING AND REPLAYING USER INTERACTION EVENT CONTENT RECEIVED AT A FRONTEND APPLICATION WHILE ASYNCHRONOUSLY LOADING RESOURCES SUPPORTING A PAGE FROM A BACKEND APPLICATION OF A MULTIUSER COLLABORATION TOOL

TECHNICAL FIELD

Embodiments described herein relate to cloud-based software platforms and, in particular, to systems and methods for determining an order in which functional elements of a particular page tree requested by a user should be loaded in a frontend application to decrease apparent load time of the frontend application.

BACKGROUND

An organization can equip its employees with a suite of cloud-based software tools to facilitate cooperation and completion of work. Each software tool can provide a unique set of features and functionality to its users, the employees of the organization.

Most users, however, only leverage a small subset of features and functionality provided by such cloud-based software tools. As a result, a significant portion of bandwidth and client-side processor and memory utilization are regularly consumed to render infrequently-used elements in frontend user interfaces associated with cloud-based software tools. Furthermore, these elements, and associated styles and client-executable scripts, increase apparent pageload time which can be frustrating to users, especially for users frequently loading a resource-intensive page for a limited purpose, such as to provide a single input before closing the page.

SUMMARY

Embodiments described herein take the form of a method of operating a backend application instantiated by interoperation of a processor and a memory allocated for the backend application by a host system, the method including operations such as, but not limited to or expressly requiring: receiving, at the backend application from a frontend application instantiated by a client device, a request for a page defined by an element tree including at least (1) a set of user interface elements, (2) a set of style elements, each style element defining a presentation style for at least one of the user interface elements, and (3) a set of frontend-executable script elements, each defining a functionality associated with at least a respective one of the set of user interface elements; determining, by the backend application from the request, user information associated with a user authenticated to the backend application operating the frontend application; identifying, by the backend application from the user information, a first frontend-executable script element of the set of frontend-executable script elements likely to receive a first user input at the frontend within a first threshold time period of initiating loading of the page in the frontend; identifying, by the backend application from the user information, a second frontend-executable script element of the set of frontend-executable script elements not likely to receive a second user input at the frontend within a second threshold time period of initiating loading of the page in the frontend; marking the second frontend-executable script element for deferred loading; associating an input buffer script of the element tree with a user interface element associated with the second frontend-executable script element, the input buffer script configured to receive the second user input within the second threshold period of time and buffer the second user input until the second frontend-executable script element may be loaded, thereafter providing the second user input to the second frontend-executable script element as input, and serving the element tree to the frontend application instance in response to the request.

Some embodiments described herein take the form of a method of submitting a request to a backend application instantiated by interoperation of a processor and a memory, allocated for the backend application by a host system, the method including operations such as, but not limited to or expressly requiring: transmitting, to the backend application from a frontend application instantiated by a client device, a request for a page the request with user information describing a user of the client device authenticated to the frontend application; receiving in response to the request, a first response including at least a first set of user interface elements, and a first set of frontend-executable script elements including at least an identifier identifying a first script associated with a functionality of a user interface element of the first set of user interface elements, the first script configured for asynchronous loading, and a second script configured to receive a user input to the user interface element and to buffer the user input; rendering, by the frontend application, the first set of user interface elements; executing, by the frontend application, the second script; receiving after the first response, a second response with the first script; and executing, by the frontend application, the first script and providing, by the second script, the user input as input to the first script.

Embodiments described herein take the form of a method of decreasing apparent load time of a pageload in a frontend application associated with a backend application of a software platform, the method including operations such as, but not limited to or expressly requiring: requesting by the frontend of the backend, the page, receiving at the frontend from the backend, a first portion of the page the first portion with an input buffer script; executing by the frontend the input buffer script; rendering by the frontend the first portion of the page; receiving an input from a user to the rendered first portion of the page; buffering the input by the input buffer script, after receiving the input; receiving at the frontend from the backend, a second portion of the page, the second portion with an input processing script; executing by the frontend the input processing script; providing, as input to the input processing script by the input buffer script, the input; and providing by the input processing script to the backend, the input.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

DETAILED DESCRIPTION

Embodiments described herein relate to systems and methods for decreasing apparent frontend load times for users of one or more multitenant collaboration tools.

More particularly, embodiments described herein relate to systems and methods for tailoring and/or conditioning responses to page requests to minimize apparent pageload time on a user-specific basis, a connection specific basis, and/or a client device specific basis.

Specifically, in many embodiments, functional frontend-executable script elements (e.g., JavaScript™ scripts, whether imported, inline, or tagged within script tags) that provide responsive functionality for one or more user interface elements can be dynamically tagged for either deferred loading or immediate loading. In many cases, deferred loading decisions can be based, at least in part, on historical usage of user interface elements associated with the functional frontend-executable script elements. For example, if a particular user interface element is infrequently used or operated by a user, team, group, organization, or tenant (whether at all, or whether used within or after a particular threshold period of time), functional frontend-executable script elements associated with that user interface element can be marked or tagged for deferred loading. In a more simple and non-limiting phrasing, infrequently used functionality of a particular page served by a backend can be loaded after frequently-used functionality of that same page. The order in which individual script elements, style elements, and/or user interface elements (or presentation layer elements) can be determined on a per user basis, a per tenant basis, a per organization basis, or any other suitable basis.

In certain cases, however, input may nevertheless be received to one or more infrequently used user interface elements before deferred-load functional frontend-executable script elements associated with those user interface elements are fully loaded. To account for this edge case, many embodiments described herein reference methods for providing a compact script—referred to herein as an "input buffer" script—with an initial page-load request response. In these constructions, input provided to elements with functionality marked for deferred loading can be buffered until that functionality is fully loaded. Once an appropriate functional frontend-executable script element is loaded (on a deferred basis), buffered input can be provided to that script (or one or more functions thereof) as input simulating the user input previously received before the script itself was loaded.

For example, a page can include a comment field and an input button. Based on historical usage data, a system as described herein may determine that a particular user rarely interacts with the input button but frequently interacts with the comment field of the page. In this example, functional frontend-executable script elements associated with the functionality of the input button can be marked for deferred loading, thereby reducing the initial pageload time of the page, and decreasing the apparent pageload time for the user.

In this example, an input buffer script can be provided with the initial pageload response request so that when the page is loaded, functional frontend-executable script elements supporting the comment field and the input buffer can be immediately executed. In this manner, at a time the user perceives the pageload as complete, full comment functionality is already available whereas functionality associated with the input button may not yet be available (as the functional frontend-executable script elements supporting the input button is loaded on a deferred basis; loading may begin after the page appears to be completely loaded for the user). In this example, the functional frontend-executable script elements supporting the input button can be loaded in the background after the page is presented to the user as "fully" loaded.

However, in some circumstances, the user may nevertheless provide input to the input button before the functional frontend-executable script elements supporting that button are fully loaded/executed. In these examples, the input buffer (which is already executed and/or otherwise loaded) can receive the unexpected user input and can buffer that user input. In some examples, buffering the user input may include storing data associated with the user input (e.g., a timestamp at which the user interacted with the input button, a text input provided by the user in a form associated with the input button, and so on). In this example, once the deferred-load script elements are fully loaded (which may be noticed by the input buffer or a monitor thereof by registering particular event hooks, as may be known to a person of skill in the art), buffered inputs can be provided as input to those script elements. In this manner, the deferred-load script elements can thereafter communicate the received inputs to one or more appropriate endpoints, which may include a backend.

As may be appreciated, different functional elements may be marked for deferred loading and input buffering depending upon users, roles, groups, teams, organizations, or other criteria. For example, a first user may interact with different content at different frequencies than another user; in this example, a request for the same page by the first user and the second user may result in a different set of functional frontend-executable script elements being loaded immediately and a different set of functional frontend-executable script elements being loaded on a deferred basis (with unexpected inputs being buffered by an input buffer script, as described above).

These foregoing examples are not exhaustive; many configurations, architectures, and implementations are possible. Generally and broadly, embodiments described herein reference systems configured to precondition page trees, and elements therein, based on a particular originator (particular frontend instance, particular bandwidth of a client device executing a frontend instance, a particular user authenticated to a frontend instance, a particular organization or tenant, and so on) of a request for that page. An input buffer script can be embedded into the page tree and served with a first response to the page request so as to buffer any unexpected input. The input buffer can forward buffered input directly to a backend for processing or, in some cases, may provide buffered input as input to a deferred-load script when that script is fully loaded.

Further, many embodiments described herein relate to systems and methods for selecting an order by which particular elements of a page tree (e.g., user interface elements, style elements, client/frontend-executable scripts)

defining a requested page are loaded or executed by a frontend application. As noted above, many embodiments are configured to load/execute user interface elements, style elements, and script elements in an order based on and/or defined at least in part by a likelihood that a user will interact with those elements (or dependences of those elements) within a threshold time of the page being entirely loaded. More specifically, a system as described herein may be configured to determine a likelihood whether a particular user interface element will receive a user input or user interaction within a threshold period of time of apparent complete loading of a page (e.g., a quickly-provided, likely, interaction) and, additionally, configured to determine a likelihood whether a particular user interface element will not receive a user input or user interaction within a threshold period of time. These two thresholds may be the same or different. In a more simple phrasing, a system as described herein can be configured to identify elements likely to receive user interaction quickly and elements unlikely or not likely to receive user interaction quickly. Based on such determinations, a system as described herein can inform one or more page element ordering decisions or page element load deferring decisions.

In another non-limiting phrasing, embodiments described herein can be configured to determine which elements among a set of page tree elements (defining a requested page) can be loaded/executed on a deferred basis and which elements should be loaded as soon as possible. As a result of these determinations and actions taken therefrom, user interface elements and supporting styles and scripts that are most useful to a particular user are loaded first, and user interface elements and supporting styles and scripts that are unlikely to be used by a particular user are deferred to a later time.

For example, a cloud-based, multitenant, collaboration tool, as described herein, can include a backend and a frontend. The backend can be instantiated as an instance of software (and/or a collection of microservices, serverless features, monolithic services, and the like) instantiated by interoperation of a processor and memory allocated for backend software by a host service.

The host service (also referred to as a cloud services provider) may maintain physical infrastructure over which one or more virtual resources, such as virtual processors, memory, communication interfaces, and so on, may be allocated. Herein, an instance of a backend software associated with a particular cloud-based collaboration tool may be referred to as a "backend application."

The backend application of a collaboration tool as described herein can be configured to communicate with a frontend application instance instantiated by a client device configured to communicably intercouple to the backend application. In particular, the client device may be a personal computing device such as a laptop computer or desktop computer; these examples are not exhaustive.

The personal computing device can include a processor and a memory configured to cooperate to instantiate a client application configured to render a graphical user interface that defines a frontend for the collaboration tool. The frontend, and in particular the graphical user interface, can be leveraged by a user of the personal computing device to interact with, and/or provide information to, the backend application. Herein, an instance of a client application/frontend software associated with a particular cloud-based collaboration tool may be referred to as a "frontend application."

A frontend application as described herein can be a native application configured to interact with the backend application via an application programming interface (API) defined by and implemented by the backend application. In some cases, API request submitted by the frontend application may be first received by an interpreter, bridge, gateway or other intermediate service (e.g., GraphQL gateway). This is not required of all embodiments.

In many embodiments, a frontend application as described herein can be a browser application configured to interact with the backend application by submitting requests to the backend application via TCP, HTTP, HTTPS, or other similar protocols. For simplicity of description, the embodiments that follow reference an implementation in which the frontend application is a browser application executing on a personal computing device such as a laptop, although it is appreciated that this is merely one example and other constructions, architectures, and implementations are possible.

In one embodiment, a user of a personal computing device (also referred to herein as a "client device") can leverage a browser application instantiated on the personal computing device to submit a HTTP or HTTPS request to the backend application. In response, the backend application can return an HTML-formatted document that can be parsed, when received, by the browser application and provided as input to one or more internal engines of the browser application for layout rendering, style calculations, and/or script execution.

As known to a person of skill in the art, an HTML-formatted document can be referred to as a "page" served by the backend application in response to a "page request" that originated from a personal computing device. The page requested by the personal computing device, and served by the backend in response to that request, may be defined by a hierarchical data structure typically referred to as a "page tree" or an "element tree." The page tree can include a set of "elements" including user interface elements (e.g., layout elements, presentation layer elements, and so on), style elements, script elements, and so on. Once the browser application receives the page tree (e.g., HTML format), the page tree can be parsed (e.g., according to the Document Object Model) and the page can be rendered on a display of the personal computing device and may receive one or more inputs from a user of that personal computing device.

For embodiments described herein, the backend application can include and/or can be communicably intercoupled with a responsive pageload preconditioner service. As used herein, the phrase "responsive pageload preconditioner service" refers to an instance of software or a function of instantiated software configured to tailor/customize element trees (and/or elements of an element tree) and/or other portions of an HTML-formatted document in a manner that optimizes apparent loading time at a client device (and/or for a user operating that client device) that originated the initial page request.

More particularly, as described herein a responsive pageload preconditioner service can be configured to determine which scripts, styles, layout elements, and/or user interface elements can be loaded on a deferred basis and which elements should be loaded on an immediate basis. Such determinations may be made on a user-specific basis, a team-specific basis, a software platform-specific basis, a tenant-specific basis, a device-specific basis, a network connection specific basis, or any suitable combination thereof.

As a result of the operation of a responsive pageload preconditioner service as described herein, a page returned in response to a page request may appear fully and entirely loaded to a particular user operating a particular device substantially faster, despite that some deferred assets have yet to be loaded completely.

For example, in one embodiment, a user of a client device, as described herein, may leverage a browser application instantiated on that client device to submit a page request to a backend application of a cloud-based collaboration tool, such as requesting a page representing a document entity stored by a documentation platform. In a conventional request-response architecture, the backend application may return to the browser application an HTML-formatted document that contains layout elements, style elements, and script elements, some of which may relate to core functionality of the documentation system and some of which may relate to rarely-used features of the documentation system (e.g., page export features, administrative features, settings, and so on). More particularly, in conventional request-response architectures, the backend application serves the entire HTML-formatted document to the browser application at once, which in turn parses the document and renders the requested page within a window of the browser application. As known to a person of skill in the art, feature-rich web applications may include a number of functional script elements and style elements, each of which may consume significant execution/processing/computation time for an end user device. Many of these features may not be useful to or needed by a particular user, but nevertheless, conventional systems serve scripts and styles supporting those features in response to each page request. In many cases, scripts and styles may be cached to improve loading times however, as known to a person of skill in the art, such scripts must still be executed and such styles must still be computed, both of which apart perceivable delay.

For example, a collaboration tool an provide a comment field functionality within a requested page. In this example, at least some of the elements of the HTML-formatted document may be associated with styling, layout, and functionality of a comment field rendered at a particular location within the requested page. As noted above, rendering (e.g., style and layout computation) of the comment field necessarily consumes both time and client-side resources (e.g., resources such as processors and memory necessary to perform style calculations, layout calculations, and script executions associated with function, layout, and styling of the comment field). In addition, all assets (e.g., scripts, styles, and layout elements) associated with the comment field and its functionality often, prior to caching, consume a portion of the bandwidth used to service the page request. In this manner, in this conventional architecture, including the comment field as a feature of the page provided by the collaboration tool necessarily increases perceived pageload time by a measurable degree.

In many cases, however, a particular user of the collaboration tool may provide comments very infrequently, if at all, when using the collaboration tool. For such users, the time required to receive, parse, process, execute, and/or perform calculations with assets associated with the comment field are entirely wasted.

More generally and broadly in view of the foregoing example, it may be appreciated that some features of some collaboration tools may be underutilized and/or entirely unused by certain users, groups of users, at certain times of day, at certain locations, and so on. Every time a backend application of such a collaboration tool serves an HTML-formatted document including assets associated with these features, end-user time may be wasted, high-speed bandwidth may be wasted, and/or client-side processor/memory resources may be wasted. In addition, resources required of the backend to serve these complete pages may be wasted. These undesirable effects may compound as new and/or more resource intensive features are added to a cloud-based collaboration tools.

The embodiments described herein account for these and other deficiencies of conventional request-response architected cloud-based collaboration tools by determining on a per-user basis (or other custom basis) which assets within an HTML-formatted document (or, more generally a structured document) can and should be loaded on a deferred and/or throttled basis. These elements, as described above, can be supported (temporarily) by an input buffer such that user inputs to infrequently operated elements or infrequently leveraged functionality may nevertheless be properly received and processed.

In a more simple phrasing, embodiments described herein modify HTML-formatted documents (as one example document type; other structured documents are suitable) prior to those documents being transmitted to a client device in order to optimize loading time—or, more precisely, apparent loading time—of features, layout, and functionality that are likely to be used by a particular user, in a particular circumstance or environment.

For example, to continue the preceding example, a responsive pageload preconditioner service may be configured to modify the HTML-formatted document to defer loading of all assets related to the comment field until after other layout, styling, and script execution operations are completed. In other cases, only script asset loading may be deferred; style and layout calculations may still be performed with initial document loading. In these constructions, the user may perceive the comment field to load, but full functionality may not be available until a later time. During this intervening period, an input buffer script can be configured to receive any user inputs provided to the comment field.

In this example, in some cases, the responsive pageload preconditioner service may be configured to render the comment field in a non-functional manner (e.g., no or substantially no script execution or remote file retrieval takes place) until after other assets of the requested page are fully rendered. In this manner, the comment field appears to be present and functional immediately on pageload but is only truly functional at a later time, after the user perceives that the page has completely loaded.

In particular, after other operations associated with loading the page are completed, script executions, WebSocket operations, style and layout calculations and so on associated with providing full functionality of the comment field can be performed, in some examples on a throttled basis and/or in the background. In addition, any previously-received inputs captured by the input buffer can be provided as input to appropriate scripts.

As may be appreciated by a person of skill in the art, for users that do not leverage the comment field, this technique achieves an apparent pageload faster than conventional architectures, while still providing full functionality to the comment field (eventually), should the user make the unexpected decision to provide a comment.

In another example, a collaboration tool may be an issue tracking system. A page of the issue tracking system may render a number of affordances (e.g., buttons, input fields, and the like) so that users can interact with and update status of different issues tracked by the issue tracking system. In these examples, a reviewing manager may typically only interact with a "close issue" button, whereas a junior developer may never interact with such a button. In this example, when a reviewing manager access a particular page, features and functionality associated with the close issue button may be loaded immediately, whereas for a junior developer accessing the same page, loading of the "close issue" button and associated styles and functionality may be deferred until after other features of the page are fully loaded.

As one particular example, a collaboration tool as described herein may be a collaborative documentation system. The documentation system may be configured to render in a frontend application documents and document content. In addition to rendering document content, the collaboration tool graphical user interface may also provide rich configuration options, template engines, comment field, media import libraries and so on. Each of these functions may be associated with certain styles, layout elements, and client-executable scripts (e.g., JavaScript™). Each of these advanced features may be associated with bandwidth consumption, frontend and backend processor/memory utilization, and rendering/layout calculation delays, such as noted above.

In this embodiment, a responsive pageload preconditioner service may be configured to receive a page request from a client device. From the request, the responsive pageload preconditioner service can extract or infer user-agent information, authenticated user information, connection quality information and so on.

In one example, the responsive pageload preconditioner service may be configured to identify a user authenticated to the backend application that is making the request. Once the user is identified, the responsive pageload preconditioner service may query a user interaction database to determine what user interface elements the identified user has historically accessed when accessing this particular page or, in some embodiments, similar pages of the documentation system.

In one example, the user may be a junior developer that has not leveraged or used any configuration options, template engines, comment field, media import libraries; the junior developer may only use the documentation system for reference.

In this example, based on the user information, the responsive pageload preconditioner service may infer that operations associated with assets/elements related to configuration options, template engines, comment field, media import libraries can be deferred until a later time. In this example, based on the user information, the responsive pageload preconditioner service may modify an HTML-formatted document representing the requested page to append a "defer" or "async" tag to one or more script elements associated with these underutilized or rarely utilized features. In this example, the entire frontend graphical user interface appears to the junior developer to load very quickly (as most high-overhead assets associated with underutilized features have yet to be executed or calculated or fetched).

These foregoing examples are not exhaustive of the various ways in which a responsive pageload preconditioner service as described herein can determine which elements may be loaded/executed on a deferred and/or throttled basis. More generally and broadly, the foregoing example described that certain assets of a page associated with functionality rarely used by a particular user may be automatically loaded on a deferred basis and/or throttled; another user requesting the same page may have a different set of elements loaded on a deferred basis and/or throttled. As such, generally and broadly, it may be appreciated that a responsive pageload preconditioner service as described herein can modify HTML served to a client based on the particular user originating the page request.

In other embodiments, a responsive pageload preconditioner service may make deferral/throttling (and/or element fetch, or execution ordering) determinations based on a user's role or one or more account properties. For example, administrative users may not have any page assets affected whereas new user accounts (e.g., less than or equal to a threshold period of days old) may flag substantially all features for deferred load. In this example, new users of a collaboration tool may encounter extremely fast loading times, encouraging exploration and interaction with the collaboration tool.

In other embodiments, a responsive pageload preconditioner service may make deferral/throttling (and/or element fetch, or execution ordering) determinations based on a time of day or environmental context. For example, historical user interaction data may determine that substantially no users leverage chat functionality after business hours. In this example, if a page that includes chat functionality is requested after business hours, assets related to the chat functionality may be flagged for deferred/throttled load. In other examples, a day of week may inform an operation of the responsive pageload preconditioner service; frequently or infrequently used features on Monday may differ (by user, by company, by tenancy, and so on) from frequently or infrequently used features on Friday and so on.

In other embodiments, a responsive pageload preconditioner service may make deferral/throttling (and/or element fetch, or execution ordering) determinations based on express preferences. For example, a particular user may expressly set a preference to never load chat features or image processing features. In other cases, a particular user may set a preference to never load animation features or libraries. In yet other cases, a particular user's supervisor may set a preference to always load chat features first so that chat availability for all members of the team is prioritized over other features of a particular page.

In yet other examples, a responsive pageload preconditioner service may be configured to prerender at least a portion of a requested page. More broadly, the responsive pageload preconditioner service may be configured for complete or partial server-side rendering. In some examples, the responsive pageload preconditioner service may be configured to extract from a particular request a user-agent and/or one or more user tokens such that a renderer operated by the responsive pageload preconditioner service can properly render at least a portion of a requested page for a particular user, on that user's particular client device. In some cases, server-side rendering may be leveraged to generate non-functional temporary/placeholder user interface elements associated with features flagged for deferred load and/or throttled load.

These foregoing examples are not exhaustive of the different ways in which a system as described herein that incorporates a responsive pageload preconditioner service (and/or functionality thereof) can be operated to customize the order in which elements are loaded, accessed, or processed by a client. Further, the systems and methods described herein can be used, in many cases, in any suitable server-client architecture.

In one implementation, the embodiments and architectures described herein reference can be leveraged by a provider of multitenant software and, in particular, by a provider of suites of multitenant software platforms, each platform being configured for a different particular purpose.

Herein, providers of systems or suites of multitenant software platforms are referred to as "multiplatform software service providers."

As known to a person of skill in the art, customers/clients of a multiplatform service provider are typically tenants of multiple platforms provided by a given multiplatform service provider. For example, a single organization (e.g., a client of a multiplatform service provider) may be a tenant of an email platform and, separately, a tenant of a calendaring platform.

The organization can create and/or purchase user accounts for its employees so that each employee has access to both email and calendaring functionality. In some cases, the organization may limit seats in each tenancy so that only certain users have access to email functionality and only certain users have access to calendaring functionality; the organization can exercise discretion as to which users have access to either or both tenancies.

In another example, a multiplatform service provider can host a suite of collaboration tools. For example, a multiplatform service provider may host, for its clients, a multitenant issue tracking system, a multitenant code repository service, and a multitenant documentation service. In this example, an organization that is a customer/client of the service provider may be a tenant of each of the issue tracking system, the code repository service, and the documentation service. As with preceding examples, the organization can create and/or purchase user accounts for its employees, so that certain selected employees have access to one or more of issue tracking functionality, documentation functionality, and code repository functionality.

Each of these platforms can be co-operated with a responsive pageload preconditioner service as described herein. More broadly, in some embodiments, a multiplatform service provider may instantiate a single cross-platform responsive pageload preconditioner service. In other embodiments, each individual platform may incorporate a different responsive pageload preconditioner service.

In some cases, a responsive pageload preconditioner service, as described herein, can be globally configured based on usage statistics across multiple users, multiple tenancies, or multiple platforms. For example, user interaction data may inform that emoji animation functionality is not used on a regular basis by any tenant of a particular multitenant platform.

In this example, the responsive pageload preconditioner service may be configured to always flag the emoji animation functionality for deferred load. In other cases, a usage statistics associated with a particular tenant inform that the tenant's users do not typically leverage text editing functionality within the first 15 seconds of loading a page, despite that the feature itself is regularly used. In this example, the responsive pageload preconditioner service may be configured to defer loading of text editing functionality until after other page assets are rendered.

In yet another example, a responsive pageload preconditioner service may be configured to determine from historical usage data that an organization's users do not use, or rarely use, chat functionality in a first platform. In this example, the responsive pageload preconditioner service may flag assets/elements related to the chat feature for deferred load in both the first platform and in a second platform.

In yet another example, a responsive pageload preconditioner service can be configured to automatically replace full-featured functionality with minimum functionality until full functionality can be loaded on a deferred basis. For example, a particular form field may be associated with a large and sophisticated validation library that consumes time and resources to load. In this example, the responsive pageload preconditioner service can be configured to automatically insert an inline script with basic validation functionality when serving a page to a page requester. At a later time, when the deferred load of the full-featured functionality is complete, the inline script can be replaced (by the client device/frontend application) with an appropriate call or reference to the validation library.

These foregoing and other embodiments are discussed below with reference to FIGS. 1-5 However, those skilled in the art will readily appreciate that the detailed description given herein with respect to these figures is for explanation only and should not be construed as limiting.

Figure 1:
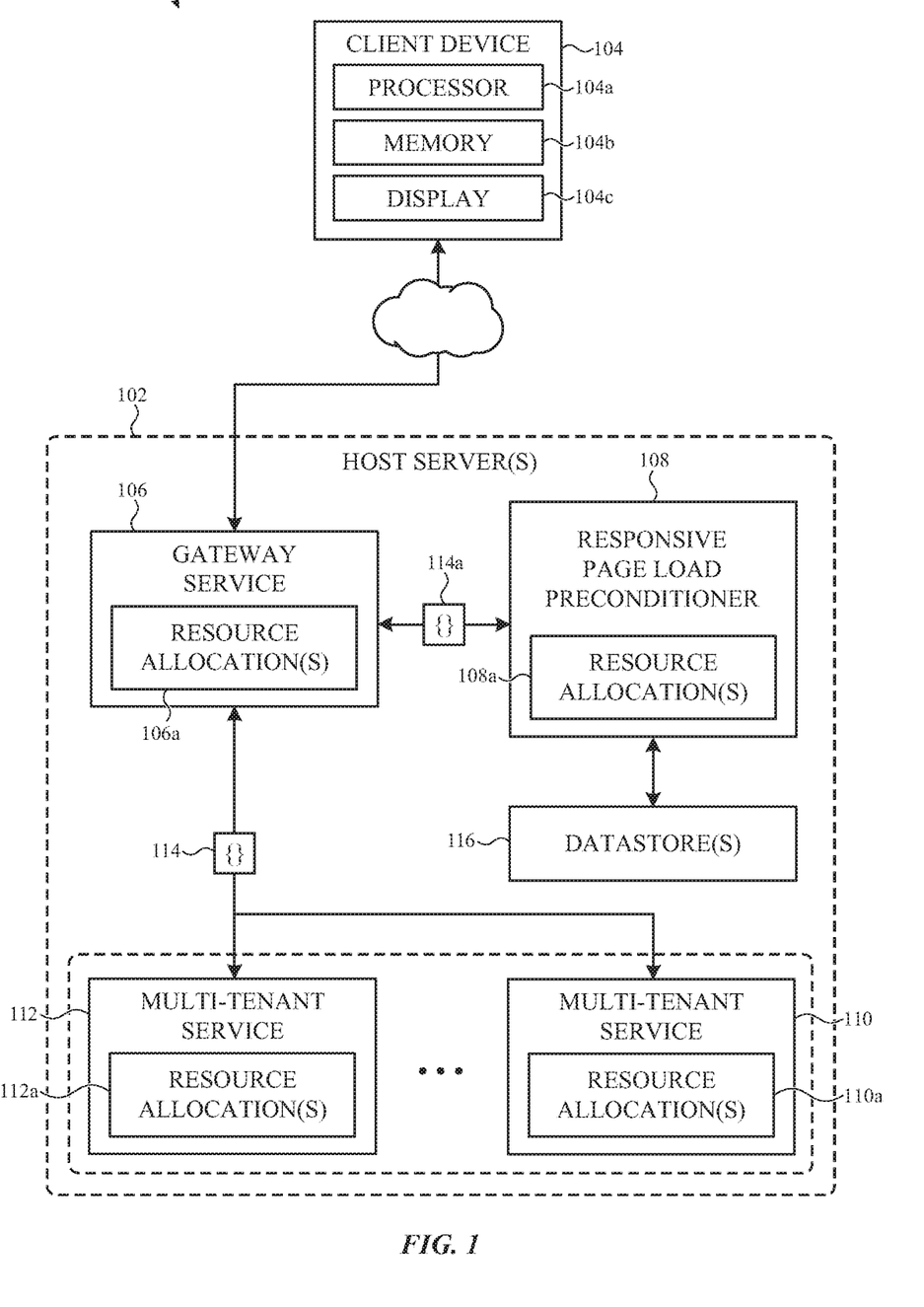
FIG. 1 depicts a simplified system diagram of a collaborative work environment leveraging a responsive pageload preconditioner service, such as described herein.

FIG. 1 depicts a simplified system diagram of a collaborative work environment 100 leveraging a responsive pageload preconditioner service, such as described herein, configured to determine an order in which to serve various page tree elements to a particular user. In a more simple phrasing, a responsive pageload preconditioner service may be referred to as a "server-side renderer" configured to prerender at least a portion of a page for a particular user, the prerendering including marking certain script elements or style elements for asynchronous or deferred loading.

For simplicity of illustration, the embodiments that follow reference an example construction in which an organization is a tenant of multiple discrete multitenant services that can be leveraged by employees of the organization to advance a common goal.

It may be appreciated that multitenant services are (e.g., platform as a service, software as a service, data as a service, and so on) merely one example of software configurations that can leverage methods and systems described herein. In particular, it may be appreciated that licensed software, single-tenant software, and/or self-hosted software tools can likewise implement systems and methods, and leverage benefits therefrom, such as described herein.

Accordingly, because a person of skill in the art will readily appreciate how asset loading ordering, deferral and/or, throttling techniques described herein can be equivalently applied to many software systems and data architectures, examples that follow reference only multitenant system architectures (e.g., systems leveraging one or more multitenant services for collaboration purposes) for simplicity of description.

Example services that can leverage methods and systems as described herein include, without limitation messaging services; telecommunication services; videoconferencing services; issue tracking services; repository services; documentation services; document management systems; knowledge sharing systems; project management services; enterprise resource planning services; supply chain management services; and so on. Any content added to any of these services, including input(s) provided to customize a particular instance (or tenant experience) of a particular multitenant service, including multimedia data such as images, audio files, or videos, can be considered user-generated, content as described herein.

In the illustrated example, the collaborative work environment 100—which is merely one example of an architecture such as described herein—includes a host server 102 that communicably couples via one or more networking or wired or wireless communication protocols to a client device 104.

It may be appreciated that other client devices may be configured in a substantially similar manner as the client device 104, although this may not be required of all embodiments and different client devices can be configured differently and/or may transact data or information with, and/or provide input(s) to, the host server 102 in a unique or device-specific manner.

The client device 104 can be any suitable personal or commercial electronic device and may include, without limitation or express requirement, a processor 104*a*, volatile or non-volatile memory (identified, collectively, as the memory 104*b*), and a display 104*c*. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104*a* of the client device 104 can be configured to execute one or more software applications (each referred to as "client applications") stored, at least in part, in the memory 104*b*.

Each respective client application can be instantiated by the processor 104*a*. In particular, the processor 104*a* may access a persistent memory (e.g., of the memory 104*b*) to retrieve one or more executable binary files and/or other computer-executable instructions (collectively, "assets"). The processor 104*a* thereafter can load at least a portion of the retrieved assets into a working memory (e.g., of the memory 104*b*), thereby at least partially instantiating the respective client application. For simplicity of description an implementation in which the client device 104 is configured to execute/instantiate a single client application, which is a browser application, is described below.

In embodiments, the host server 102 is configured to operate within or as a virtual computing environment that is supported by one or more physical servers including one or more hardware resources such as, but not limited to (or requiring) one or more of: a processor; a memory (also referred to as a working memory); non-volatile storage (also referred to as persistent memory); networking connections; and the like.

Specifically, it may be appreciated that although referred to as a singular "server", the host server 102 may be a cluster of different computing resources, which may be geographically separated from one another.

In this manner, generally and broadly, both the host server 102 and the client device 104 can be referred to, simply, as "computing resources" that are communicably coupled to one another via a suitable network connection.

As used herein, the term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

As noted above, the host server 102—and in particular a backend application instantiated over a virtual or physical processor and memory allocated for the backend application—and the client application supported/executed by the client device 104 are communicably intercoupled via a suitable network connection which may be wired, wireless, or a combination thereof. In some examples, the network connection may include the open Internet via a protocol such as TCP, HTTP, HTTPS, and the like. Although not required, in many embodiments, a cryptographically secure protocol may be used, such as HTTPS so that the client application and the backend application can exchange information in a secure manner.

In other cases, the network connection coupling the host server 102 and the client application may include only a private intranet managed by, or otherwise utilized by, an organization, such as referenced above.

The host server 102 and the client application can communicate according to any suitable protocol, form, or format. In many examples, the host server 102 at least partially exposes an API that can be accessed by the client application to perform one or more functions. For example, the client application may leverage the API to request pages (such as described herein) from the host server 102 and/or the backend application instantiated by the host server.

For simplicity of description, the embodiments that follow reference a configuration in which the host server 102 and the client application are configured to communicate and transact information according to a REST API, but it may be appreciated that this is merely one example and in other embodiments other signaling, communication, or data transaction methodologies may be used.

As noted above, the host server 102 of the collaborative work environment 100 can be configured and/or implemented in a number of suitable ways. For example, in many embodiments the host server 102 can leverage physical and/or virtual resources allocated to it to instantiate any suitable number of discrete subservices or purpose-configured modules, containers, virtual or physical networks, or virtual machines each configured to perform, coordinate, host, serve, or otherwise provide one or more services, functions, or operations of the host server 102, such as a gateway service 106.

The gateway service 106 can be hosted by a virtual machine or container executing over physical or virtual resources of the host server 102; collectively the physical and/or virtual resources allocated to instantiate the gateway service 106 are identified in the figure as the resource allocation(s) 106a. As with other embodiments described herein, the resource allocation(s) 106a can include, but may not be limited to (or may not require) one or more of: a processor; a memory; non-volatile storage; networking connections; and the like.

For example, in many constructions, the gateway service 106 is implemented in whole or in part as a software instance. The software instance defining the gateway service 106 may be instantiated by a processor among the resource allocation(s) 106a. In particular, the processor may access a persistent memory to retrieve one or more executable assets. The processor thereafter can load at least a portion of the retrieved assets into a working memory, thereby at directly or indirectly instantiating the gateway service 106.

In some embodiments, the gateway service 106 may be provided as a serverless function, may be provided as a reverse proxy, may be provided as a router appliance or as any suitable software and/or hardware appliance configurable to communicably couple at least to the client device 104 and to service requests for information therefrom, such as requests for one or more pages, such as described herein.

In other implementations, although not illustrated, the gateway service 106 may be executed/instantiated separately from the host server 102 altogether.

As noted with respect to other embodiments described herein, the gateway service 106 can be configured to receive requests and serve responses specifically related to one or more pages created and/or managed within an environment defined at least in part by a multitenant software service Such requests for one or more pages may include requests for permissions validation and/or may automatically trigger one or more permissions compliance verification operations. In some cases, the gateway service 106 may also be configured for authentication operations, but for simplicity of description the embodiments that follow reference only permissions based decision-making.

In many embodiments, the gateway service 106 is primarily configured to receive page requests from one or more client applications instantiated on one or more client devices. Once a page request is received at the gateway service 106, the request can be forwarded (either modified or unmodified) to an appropriate backend application instance, such as a backend instance associated with a multitenant service 110 (supported by appropriate resource allocations 110a) or a multitenant service 112 (also supported by appropriate resource allocations 112a).

In response to the page request, the backend application can generate, prerender, or otherwise access from a datastore a cached version of, an HTML-formatted document 114, such as described herein.

The HTML-formatted document 114 can be defined by an element tree (as known to a person of skill in the art) which can include script elements (e.g., JavaScript™), layout elements (HTML DOM elements), and/or one or more style elements (e.g., inline style sheets, Cascading Style Sheets (CSS)) and so on. As known to a person of skill in the art, these HTML elements are each associated with computational operations to be performed by the client application; the greater the number of layout elements, styles, and scripts associated with a particular page, the larger the HTML-formatted document 114 may be (consuming more bandwidth and time to transmit to the client device), and the longer it may take to completely render by the client application. This may be particularly true for lower power or older client devices.

An example multitenant service configured to serve HTML-formatted documents to client devices is a project management service. In this example, one or more pages (HTML-formatted documents) may include, within a section of the page, a task list attributed to, or otherwise associated with, a particular user of the project management service.

At some instant, the user—having been previously authenticated by a service such as a single sign-on service or other credential verification service—may operate the client device 104 to initiate a request intended to be received by the project management service to retrieve the page that includes that user's task list.

After the authenticated user of the client device 104 is determined to be authorized to view the task list, an HTML-formatted document including layout elements, script elements, and style elements defining the page and in addition, the task, list can be transmitted via a suitable channel in a suitable format (e.g., the HTML-formatted document 114), via the gateway service 106 to the client device 104 for rendering in a graphical user interface defined by the client application and displayed on the display 104c.

More particularly, in this example, the gateway service 106 interposes the project management service and the client application, routing authorized and policy-compliant requests for one or more pages (e.g., the task list) originating from the client application, to the project management service.

As understood by a person of skill in the art, as a part of servicing this request from the client device 104, the gateway service 106 can determine whether the already-authenticated user currently using the client device has permission to access the requested one or more pages, in this case, the task list. If the gateway service 106 determines that the user is not authorized to access the page, the request may be blocked.

In many embodiments, the gateway service 106 may be configured to transmit the HTML-formatted document 114 to a responsive pageload preconditioner service 108 configured, as described herein, to condition/tailor the HTML-formatted document 114 received form the gateway service 106 for fast apparent loading time on the client device. The HTML-formatted document transmitted from the gateway service 106 to the responsive pageload preconditioner service 108 is identified in FIG. 1 as the HTML-formatted document 114a. In many cases, the HTML-formatted document 114a can be prerendered, at least partially, for the client device 104. For example, as known to a person of skill in the art, many HTML pages may include JavaScript or other script elements that modify a style or presentation of a page based on a particular user. As one example, a page that includes a user profile picture may be required to identify and fetch the user's profile picture for display within the graphical user interface. In these examples, the responsive pageload preconditioner service 108 may be configured to execute certain layout or style-relevant scripts server-side, thereby reducing required operations for the client device 104 to render the HTML-formatted document 104a.

Prerendering/prefetching of a profile picture is merely one example. It may be appreciated that the responsive pageload preconditioner service 108 can be configured to prefetch and/or prerender a number of elements so as to customize a particular page for a particular user (e.g., in accordance with user style preferences, user feature preferences, and so on). In these embodiments, the responsive pageload preconditioner service 108 serves as a server-side rendered configured to reduce the number of client-side execution operations and computation operations required to display/render a particular page. In another phrasing, the responsive pageload preconditioner service 108 may operate to serve a substantially static page to the client device 104, with necessary styles and layout operations already computed.

For example, in some embodiments, the responsive pageload preconditioner service 108 can be configured to change an order of elements in the HTML-formatted document 114a in a user-specific manner, a device-specific manner, or a bandwidth/network connection specific manner. For example, over a low-bandwidth connection to a particular client device, the HTML-formatted document 114a may be rearranged such that style elements and script elements necessary to render the page are ordered before styles and scripts necessary for animations, backend communications (e.g., WebSockets and the like), so that asynchronous processing/fetching tasks related to visually presenting the page are initiated before functional scripts (or styles) related to rendering animations.

In further examples, the responsive pageload preconditioner service 108 can be configured to defer loading of animation assets so that no tasks related to animations take place until after other portions of the page are rendered. In other cases, the responsive pageload preconditioner service 108 can cause animation assets to be fetched, loaded, or executed on a throttled basis after the page has loaded.

In some cases, the responsive pageload preconditioner service 108 can modify the HTML-formatted document 114a to provide limited functional support to animation features while full animation libraries or styles are fetched, executed, or calculated in the background by the client application.

For example, the page may reference a remote JavaScript animation library that provides functions for smoothly opening one or more menus of the page. In this example, the remote library may include a number of functions not called or not used by the page. In one example, the responsive pageload preconditioner service 108 can be configured to parse through the page tree to determine what functions of the library are called by the page and can thereafter automatically reduce a copy of the remote library to only those functions and dependencies actually called by the page when rendering.

For example, the HTML-formatted document 114a received by the responsive pageload preconditioner service 108 may be:

```
<html lang="en">
<head>
    <title>Requested Page</title>
    <link rel="stylesheet" href="styles.css?v=1.0">
    <script src="https://subdomain.platform.tld/function_library.js?v=1.0"></script>
</head>
<body>
    <div id="menu"></div>
    <script src="js/settings_menu.js"></script>
</body>
</html>
```

Upon receiving the HTML-formatted document 114a, the responsive pageload preconditioner service 108 may iteratively and/or recursively determine which functions of function_library.js are called by one or more functions of settings_menu.js.

In response, the responsive pageload preconditioner service 108 may create a new script file (and/or may embed into the HTML-formatted document 114a) a reduced version of function_library.js.

For example, the resulting modified HTML-formatted document 114a may be:

```
<html lang="en">
<head>
    <title>Requested Page</title>
    <link rel="stylesheet" href="styles.css?v=1.0">
    <script src="js/function_library_min.js"></script>
</head>
<body>
    <div id="menu"></div>
    <script src="js/settings_menu.js"></script>
</body>
</html>
```

In other examples as noted above, the responsive pageload preconditioner service 108 may be configured to defer loading of the animation functionality if the responsive pageload preconditioner service 108 determines that the client device that made the page request has reduced bandwidth. For example, the resulting modified HTML-formatted document 114a may be:

```
<html lang="en">
<head>
    <title>Requested Page</title>
    <link rel="stylesheet" href="styles.css?v=1.0">
    <script src="js/function_library_min.js"></script>
</head>
<body>
    <div id="menu"></div>
    <script src="js/settings_menu.js" defer></script>
</body>
</html>
```

In yet other examples, the responsive pageload preconditioner service 108 can be configured to insert an input buffer script that loads immediately, before the settings_menu.js loads completely. For example, the resulting modified HTML-formatted document 114a may be:

```
<html lang="en">
<head>
    <title>Requested Page</title>
    <link rel="stylesheet" href="styles.css?v=1.0">
```

-continued

```
    <script src="js/function_library_min.js"></script>
</head>
<body>
    <div id="menu"></div>
    <script src="js/input_buffer"></script>
    <script src="js/settings_menu.js" defer></script>
```

-continued

```
    </body>
</html>
```

In other embodiments, an input buffer may be loaded inline within an element expecting to receive user input. In some cases, an inserted inline function can reference an input buffer function contained within in the function_library_min.js. For example, the resulting modified HTML-formatted document 114a may be:

```
<html lang="en">
<head>
    <title>Requested Page</title>
    <link rel="stylesheet" href="styles.css?v=1.0">
    <script src="js/function_library_min.js"></script>
</head>
<body>
    <div id="menu" onclick="inputBuffer(this)"></div>
    <script src="js/settings_menu.js" defer></script>
</body>
</html>
```

In yet other examples, the responsive pageload preconditioner service 108 may be configured to modify the HTML-formatted document 114a to change async loading tags with deferred loading tags. In such examples, different users with different bandwidths and different client devices can receive different HTML. For example, a high bandwidth connection to high performance client device, as detected by the responsive pageload preconditioner service 108 (e.g., via user-agent string parsing, settings, user account data and so on) may trigger the responsive pageload preconditioner service 108 to remove any deferred loading or asynchronous loading flags so that features and functionality and layout may all be rendered simultaneously for the high-performance client device.

In another example, a high bandwidth connection to a low performance client device, as detected by the responsive pageload preconditioner service 108 may trigger the responsive pageload preconditioner service 108 to insert asynchronous loading tags for one or more script elements or style sheet elements so that features and functionality and layout may all be rendered as soon as assets are available, without interfering with parsing operations related to layout or styling of the page itself.

In another example, a low bandwidth connection to a low performance client device, as detected by the responsive pageload preconditioner service 108 may trigger the responsive pageload preconditioner service 108 to insert deferred loading tags and one or more input buffer scripts or input buffer function references for one or more script elements or style sheet elements so that features and functionality and layout may all be rendered only after the pageload is complete.

In further embodiments, the responsive pageload preconditioner service 108 may be configured to make prerendering (server-side rendering), element ordering, deferred loading, asynchronous loading, or throttled loading modifications to the HTML-formatted document 114a based on inputs, metadata, and/or settings or preferences unrelated to bandwidth or client device types, such as data that may be stored in a datastore 116.

In particular, as noted above, such determinations/modifications can be made on a per-user basis based on historical user interaction data. For example, if the responsive pageload preconditioner service 108 determines that the user has not historically accessed the animated menu, the responsive pageload preconditioner service 108 may determine that loading of animation assets can be deferred, regardless of bandwidth or the user's client device.

In other embodiments, the responsive pageload preconditioner service 108 can modify the HTML-formatted document 114a based on, without limitation: a user's role; administrator preferences; a user's historical user interactions with a particular page or with similar pages or page types; a user's current task list as recorded by an issue tracking system or a project management system; time of day; time of year; geographic location of the user; connection type (e.g., ethernet, cellular, DSL, broadband, Wi-Fi); software versions of a frontend application or a backend application; software versions of a user's browser; and so on.

These examples are not exhaustive; a person of skill in the art may readily appreciate that responsive pageload preconditioner service 108 as described herein can make any suitable modifications to any suitable page served by any suitable collaboration platform. In some embodiments, multiple modifications to an HTML-formatted document may be made to improve apparent loading time for a particular user, using a particular electronic device, at a particular time of day, across a particular network connection; a first modification may be made based on bandwidth, a second modification may be made based on the user's preferences, a third modification may be made based on the user's historical user interaction data, a fourth modification may be made base on an express preference of the user's supervisor, and so on.

These foregoing embodiments depicted in FIG. 1 and the various alternatives thereof and variations thereto are presented, generally, for purposes of explanation, and to facilitate an understanding of various configurations and constructions of a responsive pageload preconditioner service (including a gateway), such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
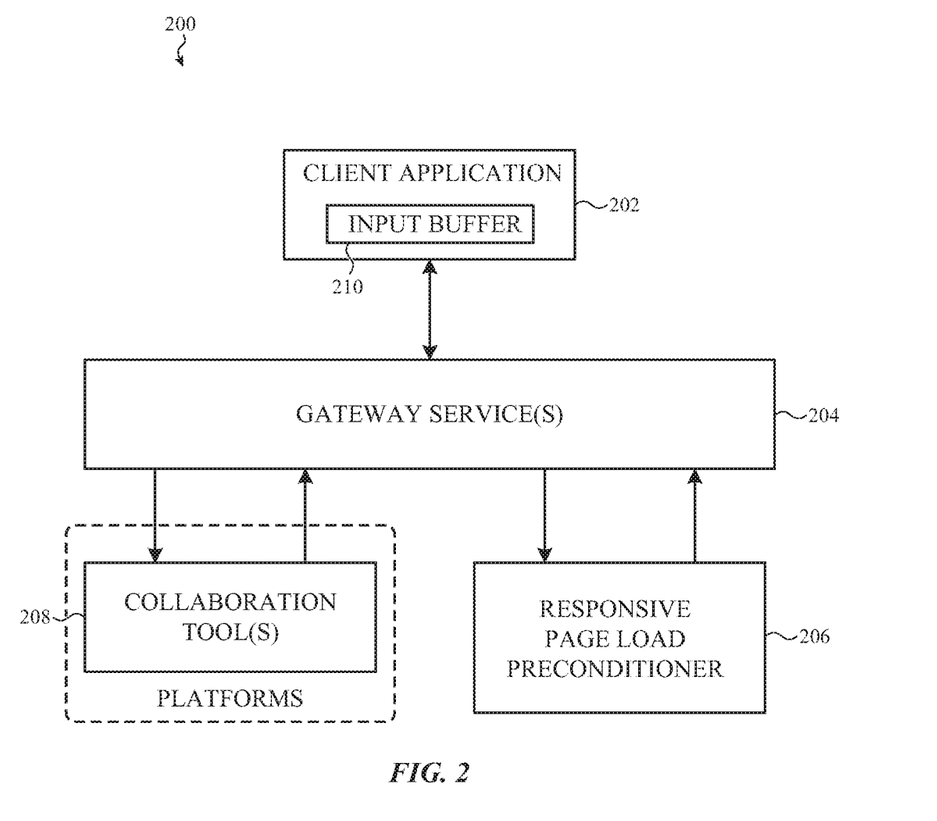
FIG. 2 depicts a simplified system diagram of system incorporating a responsive pageload preconditioner service, such as described herein.

FIG. 2 depicts a simplified system diagram of a responsive pageload preconditioner service, such as described herein. The system 200 services requests from a client device that may be configured to execute one or more instances of one or more client applications, such as described above. The client device may be configured as described above with reference to the client device 104 of FIG. 1; this description is not repeated.

As noted above, a client application instance (more simply, the "client application") executing on the client application 202 may be a native application, a browser application pointing to a particular address, or may any other suitable application or application or function wrapper. In the illustrated embodiment, the client application is identified as the client application 202. Regardless of the specific implementation of the client application 202, it is configured to communicably couple to a multitenant service. As one example, the client application 202 may be a local code repository management application and the multitenant service may be a code repository service.

As with other embodiments described herein, the client application 202 is communicably coupled to a gateway 204. The gateway 204 is in turn communicably coupled to a responsive pageload preconditioner service 206 and one or more multitenant collaboration tools 208.

As with other embodiments described herein, the responsive pageload preconditioner service 206 can be implemented as a single server or service or, in other cases, may be implemented as a distributed platform (having any suitable architecture and/or synchronization technique) in which two or more instances of a responsive pageload preconditioner service are instantiated.

In some cases, different instances can be instantiated in different geographic locations. In other cases, different instances can be instantiated in the same geographic location, and one may serve an overload protection and/or a load balancing purpose with respect to the other. For simplicity of description, a single instance is shown and labeled as the responsive pageload preconditioner service instance 206.

Similarly, the one or more multitenant collaboration tools 208 can be implemented as or on a single server or service or, in other cases, may be implemented as a distributed platform (having any suitable architecture and/or synchronization technique) in which two or more instances of a different platforms and/or services associated with those platforms are instantiated. In some cases, different instances can be instantiated in different geographic locations. In other cases, different instances can be instantiated in the same geographic location, and one may serve an overload protection and/or a load balancing purpose with respect to the other. For simplicity of description, a single instance is shown and labeled as the multitenant collaboration tool 208.

As a result of the depicted architecture, any content request initiated by the client application 202 is routed, initially, through the gateway service 204 to the collaboration tool 208. The collaboration tool 208 can provide an HTML-formatted output that can be returned to the gateway service 204 and/or can be directed to the responsive pageload preconditioner service 204. The responsive pageload preconditioner service 210 receives the content request from the gateway service 204 and based on, in one example, a content identifier and a user identifier, determines whether the identified user is permitted to access the identified content. In some cases, the responsive pageload preconditioner service 206 may be configured to load into memory one or more data sets, business rules, user preferences, and so on that can be used to make a determination, such as described herein, of how to modify a particular page request to optimize apparent loading time for the end user. Such modifications can be made based on user preferences, user historical use, team historical use, and so on. In addition, as with other embodiments described herein, the responsive pageload preconditioner service 210 can be configured to insert into a served page an input buffer, such as the input buffer 210. The input buffer 210 may be a script, a script reference, a remotely-loaded script, a function reference, or any other suitable functional code configured to buffer user inputs received to the client application 202 before elements marked for deferred loading or asynchronous loading are completely loaded.

These foregoing embodiments depicted in FIGS. 1-2 and the various alternatives thereof and variations thereto are presented, generally, for purposes of explanation, and to facilitate an understanding of various configurations and constructions of a responsive pageload preconditioner service (including a gateway), such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, generally and broadly it may be appreciated that a system as described herein can be configured specifically to decrease apparent load times for a particular user. The apparent loading time can be decrease by deferring computationally expensive (or otherwise unnecessary to perform for a particular user) calculations, operations, or script executions that are unimportant to the particular user until after other elements of the page are visually loaded. This technique affords to the user a sense that a page is completely loaded.

Phrased in another way, features and functionality regularly used by a user may be loaded first along with user interface elements—but not functionality or at least not full functionality—of features not regularly used by the user. Loading of these resources can be deferred and performed in the background. In this manner, the page will be loaded with full functionality after a period of time, but the page will appear to load in a manner usable to the user substantially faster, thereby decreasing apparent pageload time.

Figure 3:
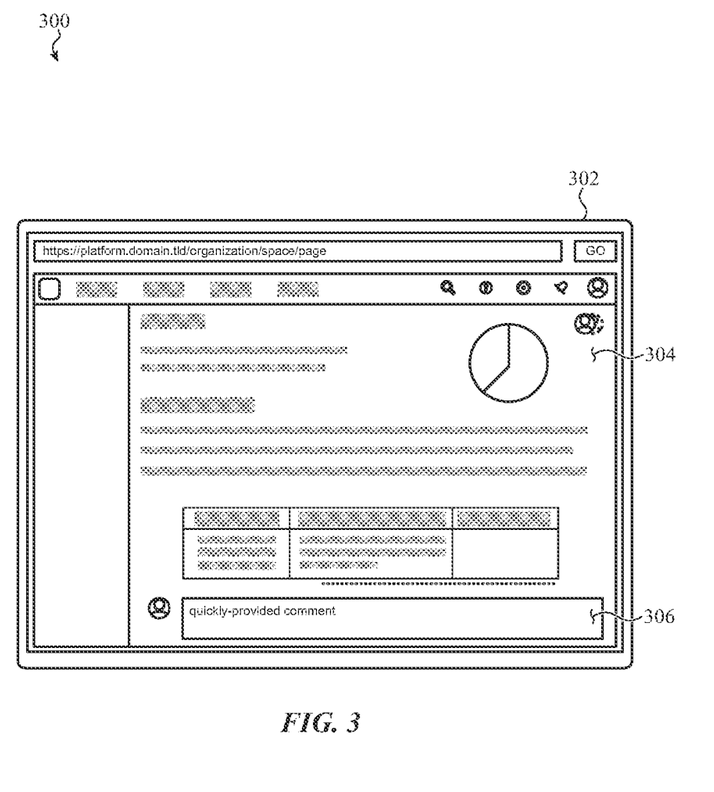
FIG. 3 depict a user interface rendered by a frontend of a system, such as described herein.

FIG. 3 depicts a client device 300 that includes a display 302. The display 302 can be leveraged by a client application (frontend application) as described herein to render a graphical user interface 304. The graphical user interface 304 may be defined at least in part by an HTML-formatted document modified for the particular user of the client device 300 by a responsive pageload preconditioner service, as described herein.

For example, the user may historically not interact with animated graphics associated with a visualization feature. The user may, however, often hover a cursor over a title to reveal a tool tip or other popup information prior to scrolling through text content of the page. The user may rarely utilize a comment function 306. Each of these user interaction histories may be obtained by querying a user interaction database. In some cases, the responsive pageload preconditioner service may query the user interaction database to obtain this information.

Recognizing that the user typically interacts with the title and text content of the page first, the responsive pageload preconditioner service may tailor the HTML-formatted document to render these elements, along with associated style calculations and script executions, as soon as possible.

In addition, recognizing that the user typically does not interact with the comment function 306, the responsive pageload preconditioner service may tailor the HTML-formatted document to load such functionality on a deferred basis and may couple the comment function 306 to an input buffer, as described above. In this manner, any quickly-provided input to the comment function 306 may be captured by the input buffer which, thereafter, may provide such input to a supporting script (deferred load) once that script is loaded.

These foregoing example embodiments are not exhaustive of the different modifications a responsive pageload preconditioner service as described herein may make to an HTML-formatted document requested by a user. In some cases, for example, the responsive pageload preconditioner service may cooperate with a cloud-based collaboration platform backend to generate custom HTML in response to a user's request. In this architecture, modification of an existing HTML-formatted document may not be required.

In other cases, the responsive pageload preconditioner service can include and/or can interoperate with a server-side rendering service that can pre-render a portion of or an entirety of a particular page requested. Many embodiments are possible.

Figure 4:
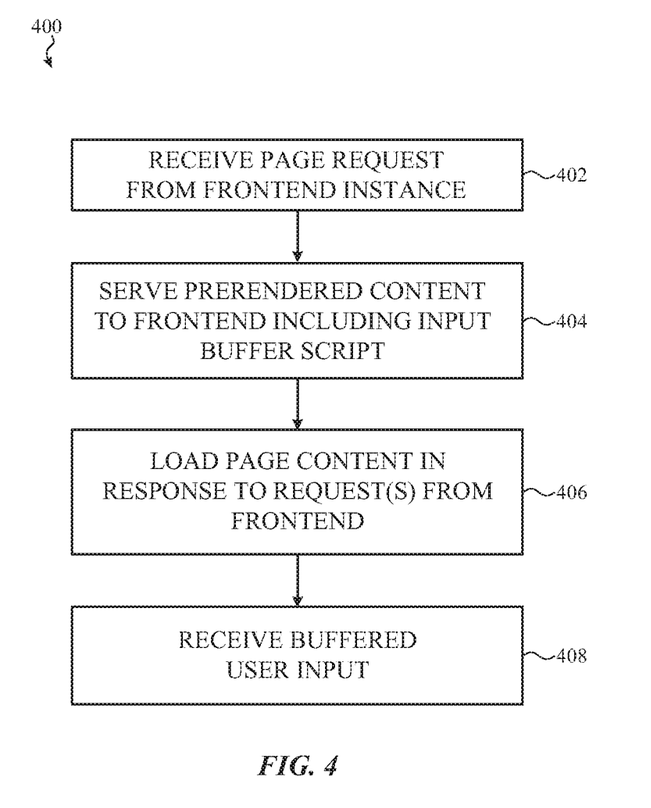
FIG. 4 is a flowchart depicting example operations of a method of operating a responsive pageload preconditioner service, such as described herein.

FIG. 4 is a flowchart depicting example operations of a method of operating a responsive pageload preconditioner service, such as described herein. The method 400 can be performed by a responsive pageload preconditioner service as described herein. In some cases, portions of the method may be performed at least in part by a gateway service as described herein. In some cases, a client device/client application can cooperate with a responsive pageload preconditioner service to execute or perform one or more operations of the method 400.

The method 400 includes operation 402 at which a page request is received, such as by a gateway service as described herein or as by a responsive pageload preconditioner service as described herein.

The method 400 includes operation 404 at which prerendered content specific to the user and/or specific in another manner can be provided/served back to the frontend that originated the request. As described above, the prerendered content (rendered server-side) can include one or more input buffer scripts that provide minimal input-capturing functionality to a user interface element otherwise associated with a functional frontend-executed script that is marked for deferred loading or asynchronous loading.

In addition, the method 400 includes operation 406 at which additional content, such as deferred content, can be loaded and/or served to the frontend that originated the request. In these examples, such content can include scripts marked for deferred load as described above.

In addition the method 400 includes operation 408 at which the backend application receives user input that was buffered by an input buffer script as described herein. The input received by the input buffer script can be provided via a script that was loaded on a deferred basis or asynchronous basis or, in some cases, provided directly from an input buffer as described herein.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

Further, many foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A method of operating a backend application instantiated by interoperation of a processor and a memory allocated for the backend application by a host system, the method comprising:
receiving, at the backend application from a frontend application instantiated by a client device, a request for a page defined by an element tree comprising:
a set of user interface elements;
a set of style elements, each style element defining a presentation style for at least one of the user interface elements; and
a set of frontend-executable script elements, each defining a functionality associated with at least a respective one of the set of user interface elements;
determining, by the backend application from the request, user information associated with a particular user authenticated to the backend application operating the frontend application;
identifying, by the backend application from the user information, a first frontend-executable script element of the set of frontend-executable script elements likely to receive a first user input by the specific user at the frontend within a first threshold time period of initiating loading of the page in the frontend;

identifying, by the backend application from the user information, a second frontend-executable script element of the set of frontend-executable script elements not likely to receive a second user input by the specific user at the frontend within a second threshold time period of initiating loading of the page in the frontend;

marking, by the backend application instance, the second frontend-executable script element for deferred loading;

associating an input buffer script of the element tree with a user interface element associated with the second frontend-executable script element, the input buffer script configured to:
  receive the second user input that is provided by the specific user prior to the second frontend-executable script being loaded; and
  buffer the second user input until after the second frontend-executable script element is loaded, thereafter providing the second user input to the second frontend-executable script element as input; and serving the element tree to the frontend application instance in response to the request.

2. The method of claim 1, wherein identifying, by the backend application from the user information, the first frontend-executable script element of the set of frontend-executable script elements likely to receive the first user input at the frontend within the first threshold time period comprises accessing a user interaction history of the user.

3. The method of claim 1, wherein identifying, by the backend application from the user information, the first frontend-executable script element of the set of frontend-executable script elements likely to receive the first user input at the frontend within the first threshold time period comprises accessing a user interaction history of a group of users to which the user belongs.

4. The method of claim 1, wherein identifying, by the backend application from the user information, the first frontend-executable script element of the set of frontend-executable script elements likely to receive the first user input at the frontend within the first threshold time period comprises accessing a user interaction history of a tenant or organization to which the user belongs.

5. The method of claim 1, wherein identifying, by the backend application from the user information, the second frontend-executable script element of the set of frontend-executable script elements likely to receive the second user input at the frontend within the second threshold time period comprises determining that the user interface element is infrequently accessed by the user.

6. The method of claim 1, wherein the backend application is associated with a collaboration tool selected from a group consisting of:
  a documentation platform;
  an issue tracking platform; and
  a project management platform.

7. The method of claim 1, wherein the user information comprises a user interaction history of the user with the user interface element.

8. The method of claim 1, wherein marking the second frontend-executable script element for deferred loading comprises modifying an attribute of an element of the element tree referencing the second frontend-executable script.

9. The method of claim 1, wherein marking the second frontend-executable script element for deferred loading comprises transmitting the second frontend-executable script element to the frontend instance after a delay.

* * * * *